(12) United States Patent
Denisyuk et al.

(10) Patent No.: US 7,364,716 B2
(45) Date of Patent: Apr. 29, 2008

(54) SURFACE MODIFIED NANOPARTICLE AND METHOD OF PREPARING SAME

(75) Inventors: Igor Y. Denisyuk, St. Petersburg (RU); Todd R. Williams, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 13 days.

(21) Appl. No.: 11/534,431

(22) Filed: Sep. 22, 2006

(65) Prior Publication Data

US 2007/0148081 A1      Jun. 28, 2007

Related U.S. Application Data

(62) Division of application No. 11/089,323, filed on Mar. 24, 2005.

(51) Int. Cl.
*C01B 17/20* (2006.01)
*C01B 17/42* (2006.01)

(52) U.S. Cl. ............... 423/511; 423/561.1; 423/566.1; 423/566.3; 977/773; 977/775

(58) Field of Classification Search ............... 423/511, 423/561.1, 566.1, 566.3; 977/773, 775
See application file for complete search history.

(56) References Cited

U.S. PATENT DOCUMENTS

| | | | |
|---|---|---|---|
| 4,165,239 | A | 8/1979 | Linden et al. |
| 5,525,377 | A | 6/1996 | Gallagher et al. |
| 5,777,433 | A | 7/1998 | Lester et al. |
| 6,548,168 | B1 | 4/2003 | Mulvaney et al. |
| 6,649,138 | B2 | 11/2003 | Adams et al. |
| 6,783,963 | B2 | 8/2004 | Mukherjee et al. |
| 6,887,517 | B1 | 5/2005 | Cook et al. |
| 7,128,891 | B1 * | 10/2006 | Sun ............... 423/511 |
| 2002/0066401 | A1 | 6/2002 | Peng et al. |
| 2002/0106476 | A1 | 8/2002 | Hirai et al. |
| 2003/0031436 | A1 | 2/2003 | Kambe et al. |
| 2003/0172868 | A1 | 9/2003 | Nho et al. |
| 2003/0176004 | A1 | 9/2003 | Garito et al. |
| 2003/0191221 | A1 | 10/2003 | Meyers et al. |
| 2004/0007169 | A1 | 1/2004 | Ohtsu et al. |
| 2004/0095658 | A1 | 5/2004 | Buretea et al. |
| 2004/0101976 | A1 | 5/2004 | Peng et al. |
| 2004/0233526 | A1 | 11/2004 | Kaminsky et al. |
| 2005/0006800 | A1 | 1/2005 | Mountziaris et al. |
| 2005/0040376 | A1 | 2/2005 | James et al. |
| 2006/0159923 | A1 | 7/2006 | Becker-Willinger et al. |
| 2006/0160940 | A1 | 7/2006 | Muhleback et al. |
| 2007/0125985 | A1 * | 6/2007 | Hirai et al. ............ 252/301.4 S |

FOREIGN PATENT DOCUMENTS

EP    1 431 352    6/2004

OTHER PUBLICATIONS

Toyoda, et al., "Irradiation time dependence of Mn-doped Zns nanocrystals with carboxylic acid on radiative and non-radiative transitions", *Preparation and Characterization, Elsevier Sequoia, NL*, vol. 438-439 (Aug. 22, 2003) pp. 132-136.

Lu et al., High Refractive Index Thin Films of ZnS/polythiourethane, J. Mater. Chem., 2003, 13, 526-530.

Lu et al., Preparation and Characterization of ZnS-polymer Nanocomposite Films With High Refractive Index, J. Mater. Chem., 2003, 13, 2189-2195.

Caseri, Nanocomposites of polymers and metals or semiconductors: Historical background and optical properties, Macromol. Rapid Commun. 21, No. 11, 705-722 (2000).

Al-Tarazl et al., Precipitation of CuS and ZnS in a Bubble Column Reactor, AlChE Journal, 2005, vol. 51, No. 1.

Zhou, et al., "Fabrication of Three-Dimensional Surface Structures with Highly Fluorescent Quantum Dots by Surface-Templated Layer-by-Layer Assembly", *Advanced Materials*, 2005, vol. 17, pp. 1243-1248.

* cited by examiner

*Primary Examiner*—Timothy C. Vanoy
(74) *Attorney, Agent, or Firm*—Elizabeth A. Gallo

(57) ABSTRACT

The present disclosure relates to a nanoparticle containing at least one metal sulfide nanocrystal having a surface modified with a carboxylic acid, wherein the carboxylic acid has at least one aryl group. The present disclosure also describes a method of preparing the nanoparticle, the method consisting of: (a) providing a first solution having a first organic solvent, and a non-alkali metal salt and a carboxylic acid dissolved therein, wherein the carboxylic acid has at least one aryl group; (b) providing a sulfide material; and (c) combining the first solution and the sulfide material to form a reaction solution, thereby forming a nanoparticle containing at least one metal sulfide nanocrystal having a surface modified with the carboxylic acid, wherein the carboxylic acid has at least one aryl group.

14 Claims, No Drawings

SURFACE MODIFIED NANOPARTICLE AND METHOD OF PREPARING SAME

CROSS-REFERENCE TO RELATED APPLICATIONS

This application is a divisional of application Ser. No. 11/089,323, filed on Mar. 24, 2005, now pending, the disclosure of which is incorporated by reference in its entirety herein.

This application is related to commonly assigned, co-pending U.S. patent applications:

Ser. No. 11/089,319 by Denisiuk et al., entitled "Polymer Nanocomposite Having Surface Modified Nanoparticles and Methods of Preparing Same", and filed Mar. 24, 2005; and Ser. No. 11/089,347 by Denisiuk et al., entitled "Method of Preparing Polymer Nanocomposite Having Surface Modified Nanoparticles", and filed Mar. 24, 2005

FIELD OF THE INVENTION

The present disclosure relates to a surface modified nanoparticle, and particularly, to a metal sulfide nanoparticle having a surface modified with a carboxylic acid, wherein the carboxylic acid comprises at least one aryl group. A method for preparing the nanoparticle is also disclosed.

BACKGROUND

Nanocomposites are mixtures of at least two different components wherein at least one of the components has one or more dimensions in the nanometer region. Nanocomposites have found use in many applications because, for example, they exhibit properties attributable to each of its components. One type of nanocomposite comprises nanoparticles distributed in an organic matrix such as a polymer. This type of nanocomposite is useful in optical applications, wherein the nanoparticles are used to increase the refractive index of the polymer. The nanoparticles must be uniformly distributed with minimal coagulation within the polymer, such that the nanocomposite exhibits minimal haze due to light scattering.

There is a need for surface modified nanoparticles that can be readily prepared and that can be used to form nanocomposites suitable for optical applications.

SUMMARY

The present disclosure relates to a nanoparticle comprising at least one metal sulfide nanocrystal having a surface modified with a carboxylic acid, wherein the carboxylic acid comprises at least one aryl group. The present disclosure also provides a method of preparing the nanoparticle, the method comprising (a) providing a first solution having a first organic solvent comprising a non-alkali metal salt and a carboxylic acid dissolved therein, wherein the carboxylic acid comprises at least one aryl group; (b) providing a sulfide material; and (c) combining the first solution and the sulfide material to form a reaction solution, thereby forming a nanoparticle comprising at least one metal sulfide nanocrystal having a surface modified with the carboxylic acid, wherein the carboxylic acid comprises at least one aryl group. The nanoparticle disclosed herein may be readily prepared and may be useful in nanocomposites for optical applications.

DETAILED DESCRIPTION

The present disclosure relates to a nanoparticle that comprises at least one metal sulfide nanocrystal having a surface modified with a carboxylic acid, wherein the carboxylic acid comprises at least one aryl group. The present disclosure also relates to a method of preparing the nanoparticle. In one embodiment, the nanoparticle may be prepared by the method:

(a) providing a first solution of a first organic solvent comprising a non-alkali metal salt and a carboxylic acid, wherein the carboxylic acid comprises at least one aryl group dissolved therein;
(b) providing a sulfide material; and
(c) combining the first solution and the sulfide material to form a reaction solution, thereby forming a nanoparticle comprising at least one metal sulfide nanocrystal having a surface modified with the carboxylic acid, wherein the carboxylic acid comprises at least one aryl group.

In another embodiment, the method may further consist of:

(d) precipitating the nanoparticle by adding a third solvent to the reaction solution, wherein the third solvent is miscible with the first organic solvent but is a poor solvent for the nanoparticle;
(e) isolating the nanoparticle;
(f) optionally washing the nanoparticle with the third solvent; and
(g) drying the nanoparticle to powder.

The first organic solvent may be any organic solvent capable of dissolving the non-alkali metal salt and the carboxylic acid comprising at least one aryl group, and it must also be compatible with the sulfide material to form the reaction solution in which the nanoparticles are formed. In one embodiment, the first organic solvent is a dipolar, aprotic organic solvent such as dimethylformamide, dimethylsulfoxide, pyridine, tetrahydrofuran, 1,4-dioxane, N-methyl pyrrolidone, propylene carbonate, or mixtures thereof.

The non-alkali metal salt provides metal ions that combine stoichiometrically with the sulfide material to form the metal sulfide nanocrystals. The particular choice of non-alkali metal salt may depend upon the solvents and/or the carboxylic acid comprising at least one aryl group used in the method described above. For example, in one embodiment, the non-alkali metal salt is a salt of a transition metal, a salt of a Group IIA metal, or mixtures thereof, because metal sulfide nanocrystals of these metals are easy to isolate when water is used as the third solvent. Examples of transition metals and Group IIA metals are Ba, Ti, Mn, Zn, Cd, Zr, Hg, and Pb.

Another factor that influences the choice of the non-alkali metal salt is the desired properties of the metal sulfide nanocrystals, and therefore, the desired properties of the nanoparticles. For example, if the nanoparticles are to be used in nanocomposites for optical applications, then the non-alkali metal salt may be a zinc salt because zinc sulfide nanocrystals are colorless and have a high refractive index. Examples of nanocomposites that the nanoparticles may be used in are described in Ser. No. 11/089,319 by Williams et al., entitled "Polymer Nanocomposite Having Surface Modified Nanoparticles and Methods of Preparing Same", and filed Mar. 24, 2005, the disclosure of which is herein incorporated by reference; and in Ser. No. 11/089,347 by Williams et al., entitled "Method of Preparing Polymer Nanocomposite Having Surface Modified Nanoparticles", and filed Mar. 24, 2005, the disclosure of which is herein incorporated by reference. For semiconductor applications, the non-alkali metal salt may be a cadmium salt because cadmium sulfide nanocrystals can absorb and emit light in useful energy ranges.

The carboxylic acid comprising at least one aryl group modifies the surface of the at least one metal sulfide nanocrystal. The particular choice of carboxylic acid comprising at least one aryl group may depend upon the solvents and the non-alkali metal salt used in the methods described above. The carboxylic acid comprising at least one aryl group must dissolve in the first organic solvent and must be capable of surface modifying the at least one metal sulfide nanocrystal that forms upon combination of the first solution with the sulfide material. Selection of the particular carboxylic acid comprising at least one aryl group may also depend upon the intended use of the nanoparticles. For use in nanocomposites, the carboxylic acid comprising at least one aryl group may aid compatibility of the nanoparticles with the organic matrix into which they are blended. In one embodiment, the carboxylic acid comprising at least one aryl group has a molecular weight of from 60 to 1000 in order to be soluble in the first organic solvent and give nanoparticles that are compatible with a wide variety of organic matrices.

In another embodiment, the carboxylic acid comprising at least one aryl group is represented by the formula:

$$\text{Ar-L}^1\text{-CO}_2\text{H}$$

wherein $L^1$ comprises an alkylene residue of from 1 to 10 C atoms, and wherein the alkylene residue is saturated, unsaturated, straight-chained, branched, or alicyclic; and Ar comprises a phenyl, phenoxy, naphthyl, naphthoxy, fluorenyl, phenylthio, or naphthylthio group.

The alkylene residue may be methylene, ethylene, propylene, butylene, or pentylene. If the alkylene residue has greater than 5 C atoms, solubility in the first organic solvent may be limited and/or surface modification may be less effective. The alkylene residue and/or the aryl group may be substituted with alkyl, aryl, alkoxy, halogen, or other groups. The carboxylic acid comprising at least one aryl group may be 3-phenylpropionic acid; 4-phenylbutyric acid; 5-phenylvaleric acid; 2-phenylbutyric acid; 3-phenylbutyric acid; 1-napthylacetic acid; 3,3,3-triphenylpropionic acid; triphenylacetic acid; 2-methoxyphenylacetic acid; 3-methoxyphenylacetic acid; 4-methoxyphenylacetic acid; 4-phenylcinnamic acid; or mixtures thereof.

In another embodiment, the carboxylic acid comprising at least one aryl group is represented by the formula:

$$\text{Ar-L}^2\text{-CO}_2\text{H}$$

wherein $L^2$ comprises a phenylene or napthylene residue; and

Ar comprises a phenyl, phenoxy, naphthyl, naphthoxy, fluorenyl, phenylthio, or naphthylthio group.

The phenylene or napthylene residue and/or the aryl group may be substituted with alkyl, aryl, alkoxy, halogen, or other groups. The carboxylic acid comprising at least one aryl group may be 2-phenoxybenzoic acid; 3-phenoxybenzoic acid; 4-phenoxybenzoic acid; 2-phenylbenzoic acid; 3-phenylbenzoic acid; 4-phenylbenzoic acid; or mixtures thereof In the first solution, useful weight ratios of the carboxylic acid comprising at least one aryl group to the non-alkali metal salt are from 1:2 to 1:200. In one embodiment, the mole ratio of the carboxylic acid comprising at least one aryl group to the non-alkali metal salt is less than 1:10. The particular weight and mole ratios used will depend on a variety of factors such as the solubilities of the carboxylic acid comprising at least one aryl group and the non-alkali metal salt, the identity of the sulfide material, the reaction conditions, e.g. temperature, time, agitation, etc.

The sulfide material used in (b) provides sulfide that stoichiometrically reacts with the non-alkali metal ions to form the at least one metal sulfide nanocrystal. In one embodiment, the sulfide material comprises hydrogen sulfide gas that may be bubbled through the first solution. In another embodiment, the sulfide material comprises a second solution of a second organic solvent containing hydrogen sulfide gas or sulfide ions dissolved therein, wherein the second organic solvent is miscible with the first organic solvent. Useful second organic solvents are methanol, ethanol, isopropanol, propanol, isobutanol, or mixtures thereof. The second solution of sulfide ions may be obtained by dissolution of a sulfide salt in the second organic solvent; useful sulfide salts are an alkali metal sulfide, ammonium sulfide, or a substituted ammonium sulfide. It is often useful to limit the amount of sulfide material to 90% of the stoichiometric equivalent of the non-alkali metal ions. In one embodiment, the first solution comprises non-alkali metal ions dissolved therein, and the second solution comprises sulfide ions dissolved therein, and the mole ratio of the non-alkali metal ions to the sulfide ions is 10:9 or more.

The nanoparticle disclosed herein comprises at least one metal sulfide nanocrystal. In one embodiment, the metal sulfide nanocrystals are transition metal sulfide nanocrystals, Group IIA metal sulfide nanocrystals, or mixtures thereof. In another embodiment, the metal sulfide nanocrystals comprise zinc metal sulfide nanocrystals. In yet another embodiment, the mineral form of the zinc metal sulfide nanocrystals is sphalerite crystal form, because sphalerite crystal form has the highest refractive index compared to other mineral forms of zinc sulfide, and so is very useful in nanocomposites for optical applications.

The nanoparticle disclosed herein comprises at least one metal sulfide nanocrystal, and the exact number of nanocrystals may vary depending on a variety of factors. For example, the number of nanocrystals in each nanoparticle may vary depending on the particular choice of the non-alkali metal salt, the carboxylic acid comprising at least one aryl group, or the sulfide material, as well as their concentrations and relative amounts used in (a), (b), or (c). The number of nanocrystals in each nanoparticle may also vary depending on reaction conditions used in (a), (b), or (c); examples of reaction conditions include temperature, time, and agitation, etc. All of these aforementioned factors may also influence shape, density, and size of the nanocrystals, as well as their overall crystalline quality and purity. The number of metal sulfide nanocrystals may vary for each individual nanoparticle in a given reaction solution, even though the nanoparticles are formed from the same non-alkali metal ions and sulfide material, and in the same reaction solution.

The at least one metal sulfide nanocrystal has a surface modified by the carboxylic acid comprising at least one aryl group. The number of surfaces may vary depending on the factors described in the previous paragraph, as well as on the particular arrangement of nanocrystals within the nanoparticle if more than one nanocrystal is present. One or more individual carboxylic acid molecules may be involved in the surface modification, and there is no limit to the particular arrangement and/or interaction between the one or more carboxylic acid molecules and the at least one metal sulfide nanocrystal as long as the desired properties of the nanoparticle are obtained. For example, many carboxylic acid molecules may form a shell-like coating that encapsulates the at least one metal sulfide nanocrystal, or only one or two carboxylic acid molecules may interact with the at least one metal sulfide nanocrystal.

The nanoparticle disclosed herein may have any average particle size depending on the particular application. As used herein, average particle size refers to the size of the nanoparticles that can be measured by conventional methods, which may or may not include the carboxylic acid comprising at least one aryl group. The average particle size may directly correlate with the number, shape, size, etc. of the at least one nanocrystal present in the nanoparticle, and the factors described above may be varied accordingly. In general, the average particle size may be 1 micron or less. In some applications, the average particle size may be 500 nm or less, and in others, 200 nm or less. If used in nanocomposites for optical applications, the average particle size is 50 nm or less in order to minimize light scatter. In some optical applications, the average particle size may be 20 nm or less.

Average particle size may be determined from the shift of the exciton absorption edge in the absorption spectrum of the nanoparticle in solution. Results are consistent with an earlier report on ZnS average particle size—(R. Rossetti, Y. Yang, F. L. Bian and J. C. Brus, J. Chem. Phys. 1985, 82, 552). Average particle size may also be determined using transmission electron microscopy.

The nanoparticles may be isolated by using any conventional techniques known in the art of synthetic chemistry. In one embodiment, the nanoparticles are isolated as described in (d) to (g) above. The third solvent is added to the reaction solution in order to precipitate the nanoparticles. Any third solvent may be used as long as it is a poor solvent for the nanoparticles and a solvent for all the other components remaining in the reaction solution. A poor solvent may be one that can dissolve less than 1 weight % of its weight of nanoparticles. In one embodiment, the third solvent is water, a water miscible organic solvent, or mixtures thereof. Examples of water miscible organic solvents include methanol, ethanol, and isopropanol.

The nanoparticles may be isolated by centrifugation, filtration, etc., and subsequently washed with the third solvent to remove non-volatile by-products and impurities. The nanoparticles may then be dried, for example, under ambient conditions or under vacuum. For some applications, removal of all solvents is critical. For nanocomposites used in optical applications, residual solvent may lower the refractive index of the nanoparticles, or cause bubbles and/or haze to form within the nanocomposite.

The examples described below are presented for illustration purposes only and are not intended to limit the scope of the invention in any way.

EXAMPLES

Nanoparticles and Their Preparation

Preparation of $H_2S$ in Isopropanol

A solution containing 0.200 g of zinc acetate dihydrate (0.00091 mole) in 10 mL dimethylformamide (DMF) was prepared. Another solution containing $H_2S$ in isopropanol (IPA) was prepared by passing a stream of fine bubbles of the $H_2S$ gas through the IPA for 24 hours, after which time it was assumed that the solution was saturated. The zinc acetate solution was titrated with the $H_2S$ solution until lead acetate paper indicated the presence of excess $H_2S$. From this titration was determined the volume of the $H_2S$ solution having 0.00083 mole of $H_2S$ (10 mole % excess of zinc over $H_2S$). In order to prepare solutions for the following examples, this determined volume was multiplied by 10 and then IPA was added to make a total volume of 50 mL.

Nanoparticle NP-1

A solution was prepared by dissolving 2.0 g of zinc acetate dihydrate (0.0091 mole) and 0.06 g of 2-phenoxybenzoic acid in 40 mL of DMF. This was poured into 50 mL of the $H_2S$ solution described above, containing 0.0083 mole of $H_2S$ in IPA, wth strong stirring agitation. To the resulting mixture was added with stirring 100 mL of water. The resulting mixture was allowed to stand at ambient conditions. A precipitate was formed over a day and was separated by centrifugation and washed with water and IPA. After drying overnight in a vacuum desiccator, a small amount of the solid was dissolved in DMF using ultrasonic agitation. This solution was examined using UV-VIS spectroscopy, and a shoulder on the absorption curve occurred at 290 nm, corresponding to an average particle size of 3.0 nm. Preparation of NP-1 was repeated and the average particle size was 3.6 nm.

Nanoparticles NP-2 to NP-17

Nanoparticles NP-2 to NP-17 were prepared as described for Nanoparticle NP-1, except that different carboxylic acids were used. The amount of the carboxylic acid was 0.06 g in each example, therefore the mole ratio of carboxylic acid to zinc acetate varied. A summary of the nanoparticles is listed in Table 1. The mole ratios of carboxylic acid to zinc acetate ranged from 0.022 to 0.048, and the average particle sizes ranged from 3 to 8 nm.

TABLE 1

| Nano-particle | Carboxylic Acid | MW of Carboxylic Acid | Mole Ratio of Carboxylic Acid to Zinc Acetate* | Average Particle Size (nm) |
| --- | --- | --- | --- | --- |
| NP-1 | 2-phenoxybenzoic acid | 214 | 0.03 | 3.0, 3.6 |
| NP-2 | 3-phenylpropionic acid | 150 | 0.044 | 4.5 |
| NP-3 | 2-phenylbutyric acid | 164 | 0.04 | 3.8 |
| NP-4 | 4-phenylbutyric acid | 164 | 0.04 | 4.0 |
| NP-5 | 2-naphthoxyacetic acid | 202 | 0.032 | 3.2 |
| NP-6 | 3-phenoxypropionic acid | 166 | 0.04 | 5.0 |
| NP-7 | 1-naphthylacetic acid | 186 | 0.035 | 4.6 |
| NP-8 | triphenylacetic acid | 288 | 0.023 | 4.0 |
| NP-9 | 5-phenylvaleric acid | 178 | 0.037 | 4.2 |
| NP-10 | benzoic acid | 136 | 0.048 | NM |
| NP-11 | phenoxyacetic acid | 152 | 0.043 | NM |
| NP-12 | 2-phenoxypropionic acid | 166 | 0.04 | NM |
| NP-13 | 3-phenylbutyric acid | 164 | 0.04 | NM |
| NP-14 | 2-phenoxybutyric acid | 180 | 0.037 | NM |
| NP-15 | 2-methoxyphenylacetic acid | 166 | 0.04 | NM |
| NP-16 | 3,3,3-triphenylpropionic acid | 302 | 0.022 | NM |
| NP-17 | 4-phenylcinnamic acid | 240 | 0.027 | NM |

NM = not measured
*MW of zinc acetate is 219

Dependence of Average Particle Size on the Concentration of Carboxylic Acid

The dependence of average particle size on the concentration of carboxylic acid was determined for NP-9, NP-1 and NP-4. The weight percent concentration of each carboxylic acid relative to zinc acetate was varied between 0.50 and 50.00 weight %, and the results are shown in Table 2.

The results show that only small changes in average particle sizes for NP-9, NP-1 and NP-4 as a function of % of carboxylic acid were observed.

TABLE 2

| Weight % of Carboxylic Acid Relative to Zinc | Average Particle Size (nm) | | |
|---|---|---|---|
| Acetate | NP-9 | NP-1 | NP-4 |
| 50.00 | 3 | 2 | 2.2 |
| 33.33 | 3 | 2.2 | 3 |
| 9.09 | 3.8 | 3.8 | 3.8 |
| 0.50 | 3.8 | 4.5 | 3.8 |

Dependence of Average Particle Size on Temperature

The dependence of average particle size on temperature was determined for NP-2. The temperature of the mixture containing zinc acetate, 3-phenylpropionic acid, and $H_2S$ was varied between −20 and 20° C., and the results are shown in Table 3. The results show that only a small average particle size change as a function of temperature was observed for NP-2, and all were within the desired range.

TABLE 3

| Temperature (° C.) | Average Particle Size (nm) |
|---|---|
| −20 | 1.6 |
| 5 | 3.0 |
| 20 | 3.7 |

What is claimed is:

1. A method of preparing a nanoparticle, the method comprising:
   (a) providing a first solution having a first organic solvent comprising a non-alkali metal salt and a carboxylic acid dissolved therein, wherein the carboxylic acid comprises at least one aryl group;
   (b) providing a sulfide material; and
   (c) combining the first solution and the sulfide material to form a reaction solution, thereby forming a nanoparticle comprising at least one metal sulfide nanocrystal having a surface modified with the carboxylic acid, wherein the carboxylic acid comprises at least one aryl group.

2. The method of claim 1, wherein the first organic solvent is a dipolar, aprotic organic solvent.

3. The method of claim 1, wherein the first organic solvent is dimethylformamide, dimethylsulfoxide, pyridine, tetrahydrofuran, 1,4-dioxane, N-methyl pyrrolidone, propylene carbonate, or mixtures thereof.

4. The method of claim 1, wherein the non-alkali metal salt is a salt of a transition metal, a salt of a Group IIA metal, or mixtures thereof.

5. The method of claim 1, wherein the nanoparticle has an average particle size of 50 nm or less.

6. The method of claim 1, wherein the carboxylic acid comprising at least one aryl group has a molecular weight of from 60 to 1000.

7. The method of claim 1, wherein the weight ratio of the carboxylic acid comprising at least one aryl group to the non-alkali metal salt is from 1:2 to 1:200.

8. The method of claim 1, wherein the sulfide material comprises hydrogen sulfide gas.

9. The method of claim 1, wherein the sulfide material comprises a second solution having a second organic solvent comprising hydrogen sulfide gas or sulfide ions dissolved therein, wherein the second organic solvent is miscible with the first organic solvent.

10. The method of claim 9, wherein the first solution comprises non-alkali metal ions dissolved therein, and the second solution comprises sulfide ions dissolved therein, and the mole ratio of the non-alkali metal ions to the sulfide ions is 10:9 or more.

11. The method of claim 10, wherein the second solution comprises a sulfide salt dissolved therein, wherein the sulfide salt comprises an alkali metal sulfide, ammonium sulfide, or a substituted ammonium sulfide.

12. The method of claim 9, wherein the second organic solvent is methanol, ethanol, isopropanol, propanol, isobutanol, or mixtures thereof.

13. The method of claim 1 further comprising:
   (d) precipitating the nanoparticle by adding a third solvent to the reaction solution, wherein the third solvent is miscible with the first organic solvent but is a poor solvent for the nanoparticle;
   (e) isolating the nanoparticle;
   (f) optionally washing the nanoparticle with the third solvent; and
   (g) drying the nanoparticle to powder.

14. The method of claim 13, wherein the third solvent comprises water, a water miscible organic solvent, or mixtures thereof.

* * * * *